(12) United States Patent
Derrez et al.

(10) Patent No.: US 10,118,710 B2
(45) Date of Patent: Nov. 6, 2018

(54) UNDUCTED FAN FOR AN AIRCRAFT TURBINE ENGINE

(71) Applicants: SNECMA, Paris (FR); AIRCELLE, Gonfreville l'Orcher (FR)

(72) Inventors: Charles-Henri Michel Marie Derrez, Montrouge (FR); Adrien Jacques Philippe Fabre, Montrouge (FR); Sebastien Marcelino Juste, Boissise le Roi (FR); Cyril Roger Yves Le Pecheur, Grandvillars (FR); Michel Pierre Rognant, Le Havre (FR)

(73) Assignees: SAFRAN AIRCRAFT ENGINES, Paris (FR); AIRCELLE, Gonfreville l'Orcher (FR)

( * ) Notice: Subject to any disclaimer, the term of this patent is extended or adjusted under 35 U.S.C. 154(b) by 257 days.

(21) Appl. No.: 15/050,637

(22) Filed: Feb. 23, 2016

(65) Prior Publication Data
US 2016/0244175 A1    Aug. 25, 2016

(30) Foreign Application Priority Data
Feb. 24, 2015  (FR) ...................................... 15 51586

(51) Int. Cl.
*B64D 29/06*      (2006.01)
*B64C 11/02*      (2006.01)
(Continued)

(52) U.S. Cl.
CPC .............. *B64D 29/06* (2013.01); *B64C 11/02* (2013.01); *B64C 11/06* (2013.01); *B64C 11/48* (2013.01);
(Continued)

(58) Field of Classification Search
CPC ......... B64C 11/02; B64C 11/04; B64C 11/06; B64C 11/48; B64D 27/10; B64D 29/08;
(Continued)

(56) References Cited

U.S. PATENT DOCUMENTS 5,082,424 A   1/1992  Husain et al.
5,112,191 A   5/1992  Strock et al.
(Continued)

FOREIGN PATENT DOCUMENTS

DE    40 17 586 A1    12/1990
FR    2 645 499 A1    10/1990
(Continued)

OTHER PUBLICATIONS

French Preliminary Search Report dated Sep. 15, 2015 in French Application 15 51586, filed Feb. 24, 2015 (with English Translation of Categories of Cited Documents).

*Primary Examiner* — Woody Lee, Jr.
*Assistant Examiner* — Sang K Kim
(74) *Attorney, Agent, or Firm* — Oblon, McClelland, Maier & Neustadt, L.L.P.

(57) ABSTRACT

An unducted fan for an aircraft turbine engine, including a propeller having a hub and an annular array of blades extending substantially radially outwards from the hub, is provided. The hub includes an annular array of cowls, each of which is mounted between the radially inner ends of the blades and suitable for being fixed to an upstream collar and to a downstream collar of the hub. At least one cowl includes, at a circumferential end, a joint edge which is contiguous with a complementary joint edge of an adjacent cowl. The at least one cowl and at least one of the upstream and downstream collars are configured so that the cowl can be mounted and dismounted by a movement including a (Continued)

pivoting about an initial pivot axis circumferentially separated from the at least one joint edge.

13 Claims, 7 Drawing Sheets

(51) Int. Cl.
| | | |
|---|---|---|
| *B64C 11/06* | (2006.01) | |
| *B64C 11/48* | (2006.01) | |
| *F04D 29/32* | (2006.01) | |
| *B64D 27/10* | (2006.01) | |
| *B64D 29/08* | (2006.01) | |
| *B64F 5/40* | (2017.01) | |

(52) U.S. Cl.
CPC ............ *B64D 27/10* (2013.01); *B64D 29/08* (2013.01); *B64F 5/40* (2017.01); *F04D 29/323* (2013.01); *F04D 29/329* (2013.01); *Y02T 50/66* (2013.01)

(58) Field of Classification Search
CPC ... B64D 29/06; B64F 5/40; F01D 1/24; F01D 5/025; F01D 5/3023; F01D 7/02; F04D 29/323; F04D 29/329; Y02T 50/66
See application file for complete search history.

(56) References Cited

U.S. PATENT DOCUMENTS

| | | | |
|---|---|---|---|
| 5,224,831 A * | 7/1993 | Hermans | B64C 11/06 |
| | | | 416/129 |
| 5,263,898 A | 11/1993 | Elston, III et al. | |
| 9,790,794 B2 * | 10/2017 | Chartier | F01D 5/081 |
| 2012/0134822 A1 | 5/2012 | Boston et al. | |
| 2012/0257975 A1 | 10/2012 | Boston et al. | |
| 2017/0313404 A1* | 11/2017 | Colmagro | B64C 11/06 |

FOREIGN PATENT DOCUMENTS

| | | |
|---|---|---|
| WO | WO 2011/015475 A1 | 2/2011 |
| WO | WO 2011/069981 A1 | 6/2011 |

* cited by examiner

UNDUCTED FAN FOR AN AIRCRAFT TURBINE ENGINE

TECHNICAL FIELD

The present invention relates to an unducted fan, which is also known as an "open rotor", for an aircraft turbine engine.

PRIOR ART

A turbine engine of this type is described in WO A1 2011/069981. It comprises mainly, along a longitudinal axis and inside a cylindrical nacelle, supported by the structure of the aircraft (such as the rear portion of the fuselage of an aeroplane), a "gas generator" part and a "propulsion" part (only the nacelle part covering the gas generator is fixed, whereas the nacelle parts situated at the propellers are rotatory). The propulsion part comprises an unducted fan comprising two coaxial contrarotating propellers, which are upstream (front) and downstream (rear) respectively, which are driven, so as to rotate in opposite directions to each other, by a suitable mechanism driven by a power turbine situated at the output of the gas generator part.

Each propeller comprises a hub having an axis of revolution and bearing an annular array of blades extending substantially radially outwards from the hub, and outside the nacelle. The hub also comprises cowls that form rotating parts of the nacelle.

To allow optimum operation of the turbine engine in the various flight phases encountered, the blades of the contrarotating propellers are able to turn in the radial recesses of the hub. The blades are rotated about the respective pivot axes thereof, by a suitable orientation system making it possible to vary the pitch of the blades during flight, that is to say the pitch of the propellers. For example, the blades may vary, according to the system, from +90° to 30° for the flight phases and from +30° to –30° for the taxiing and reversing phases, and have a rapid return to 90°, in the feathered position, in the event of malfunction in flight (engine failure), for which the blades are retracted with respect to the direction of travel of the aircraft and offer the least possible drag.

Each blade in general comprises a root that is engaged in a groove having a complementary shape in a plate with a view to holding said root radially outwards, with respect to the axis of revolution or rotation of the propeller. The plate in general comprises a cylindrical portion forming a pivot and defining a radial rotation axis for setting the pitch of the blade.

The cowls of each propeller extend around the hub and are in general intended to be aligned with the radially outer surfaces of the plates supporting the blades.

FR-A1-2 645 499 describes variant embodiments of cowls according to the prior art. In FIG. 4 of this document, the propeller is equipped with an annular array of cowls that each comprise, substantially at the middle thereof, an opening for mounting the plate supporting a blade. In FIG. 8, the propeller is equipped with an annular array of cowls that are each mounted between two adjacent blades. Each cowl comprises, at each of the circumferential ends thereof, recesses for mounting the plates supporting the adjacent blades. The cowls are not directly contiguous, since packings are interposed between the circumferential ends of the cowls. Thus each cowl comprises at the circumferential ends thereof joint edges that are complementary to joint edges of packings. When the blades are in the feathered position (FIG. 8), the radially inner ends of the leading and trailing edges of the blades are situated above and at a short distance from the packings and therefore do not interfere with the removal of the cowls, by radially outward translation.

It is important to be able to remove the cowls, without dismantling the blades, in order to access the annular space lying between the hub and the cowls, in which portions of the plates are situated, as well as equipment such as a telemetry box, for maintenance or inspection operations.

However, the technology described above for inter-blade cowls has drawbacks. The cowling of the propeller hub, formed by the cowls and packings, is formed by a large number of parts, which results in a relatively long time taken for mounting and dismounting the cowl, and therefore a relatively long aircraft immobilisation time.

The present invention proposes an improvement to this technology that is simple, effective and economical.

DISCLOSURE OF THE INVENTION

The invention proposes an unducted fan for an aircraft turbine engine, comprising at least one propeller comprising a hub and an annular array of blades extending substantially radially outwards from said hub, the hub comprising an annular array of cowls which is mounted between the radially inner ends of the blades and suitable for being fixed to an upstream collar and to a downstream collar of the hub, characterised in that at least one cowl comprises, at a circumferential end, at least one joint edge which is contiguous with a complementary joint edge of an adjacent cowl, and in that said at least one cowl and at least one of said upstream and downstream collars are configured so that the cowl can be mounted and dismounted by a movement including, at least at the start thereof, a pivoting about an initial pivot axis which is circumferentially separated from said at least one joint edge in the direction of a centre of the cowl, and so that, during said pivoting, said at least one joint edge moves radially away from said complementary joint edge by moving towards the inside of said hub.

The cowling of the propeller hub thus does not comprise any packings, since each cowl comprises, at the circumferential ends thereof, joint edges which are complementary to joint edges of adjacent cowls. Moreover, according to an essential feature of the invention, the cowls may be mounted and dismounted by pivoting thereof. Unlike the prior art, in which, although this is not provided for, it would be possible to attempt to pivot a cowl about a pivot axis extending along the joint edges of one of the circumferential ends of the cowl, the pivot axis of each cowl is in this case circumferentially separated from the joint edges of the cowl, and this makes it possible in particular to prevent any blockage between the cowl and the radially inner ends of the blades closest to the pivot axis, as will be described in more detail hereinafter.

The advantages related to this invention may for example be: small number of parts and standards; low weight, an important criterion for an open rotor; ease of mounting without removing the blades, due to the reduction in the number of parts in the absence of the packings required in the devices from FR-A1-2 645 499; better resistance to centrifugal force; better rigidity; etc.

In the present application, collar means an annular element such as a ring, which is rigidly connected to an annular structure supporting the blades. Said collar may be fixed to the annular support structure (cf. rings 60 and 62 in FR-A1-2 645 499), or be formed directly by annular end flanks of the structure (cf. flanks 20 and 21 in WO A1 2011/069981).

According to the invention, the pivot axis of cowl is said to be initial since it is liable to move during the removal of the cowl. In other words, the position of the pivot axis of the cowl may vary during dismounting.

The unducted fan according to the invention may have one or more of the following features, taken in isolation from one another or in combination with one another;

- said initial pivot axis passes substantially through at least one pivot region for contact between the cowl and the upstream collar and/or the downstream collar of the hub;
- each cowl comprises, at each of the circumferential ends thereof, a first joint edge of the upstream side and a second joint edge of the downstream side, said first and second joint edges being connected by a complementary concave curved edge of a plate supporting a blade;
- the first and second joint edges of each circumferential end of each cowl are aligned at least in part;
- the first and second joint edges of each circumferential end of each cowl extend at least in part in respectively two straight lines which are substantially parallel to each other and are separated circumferentially from each other;
- each joint edge has a straight shape which is substantially parallel to an axis of revolution of the propeller or has a shape having two contiguous straight-line segments, one of which is substantially parallel to said axis of revolution;
- the joint edges of one of the circumferential ends of each cowl each comprise a bevelled end portion that joins said concave curved edge;
- each cowl comprises, at one of the circumferential ends thereof, at least one lug of reduced thickness terminating in said at least one joint edge and configured so as to be covered by a complementary lug of reduced thickness of the adjacent cowl, the latter lug comprising said complementary joint edge;
- the or each lug comprises screw mounting orifices for fixing the cowl to the adjacent cowl;
- each collar comprises a cylindrical rim for the support and fixing of a circumferential edge of each cowl, said pivot region for contact between the cowl and at least one of said collars being formed on at least one of said cylindrical rims;
- the cylindrical rim of at least one of the collars comprises radial through notches which are configured so as to allow the pivoting of the cowls;
- at least one of the circumferential edges of each cowl comprises at least one radial through notchthrough notch which is configured so as to allow pivoting of the cowl;
- at least one of said radial through notches creates an edge forming a said pivot contact region;
- the cowls are covered by the radially inner ends of the leading and/or trailing edges of at least some of the blades.

The present invention also relates to an aircraft turbine engine, characterised in that it comprises at least one unducted fan as described above, said fan preferably comprising two coaxial and contrarotating propellers.

The present invention also relates to a method for removing a cowl of an unducted fan according to one of the preceding claims, characterised in that it comprises the steps consisting in:

a) from the two blades which are adjacent to the cowl, putting the blade which is furthest away from the initial pivot axis of the cowl in a position in which the radially inner end of the blade does not comprise any region covering a circumferential end of the cowl, while the blade which is closest to said pivot axis has a leading and/or trailing edge having a radially inner end covering another circumferential end of the cowl, b) pivoting the cowl about said initial pivot axis, so that the circumferential end of the cowl which is furthest away from said axis moves radially away from the hub, and c) removing the cowl.

Step c) may comprise a substep consisting in moving the cowl so that the centre thereof circumferentially approaches the blade which is furthest away from the initial pivot axis, while pivoting the cowl about a pivot axis which is combined with or separate from the initial pivot axis.

DESCRIPTION OF THE FIGURES

The invention will be better understood, and other details, features and advantages of the invention will become clearer upon reading the following description given by way of non-limiting example and with reference to the accompanying drawings, in which.

DETAILED DESCRIPTION

Figure 1:
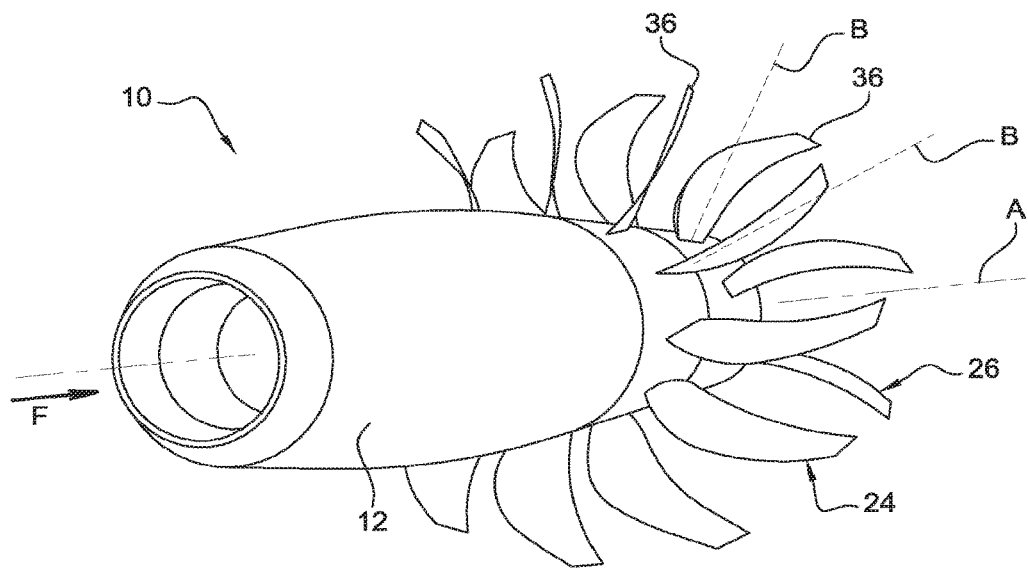
FIG. 1 is a partial schematic perspective view of a turbine engine comprising an unducted fan.
Figure 2:
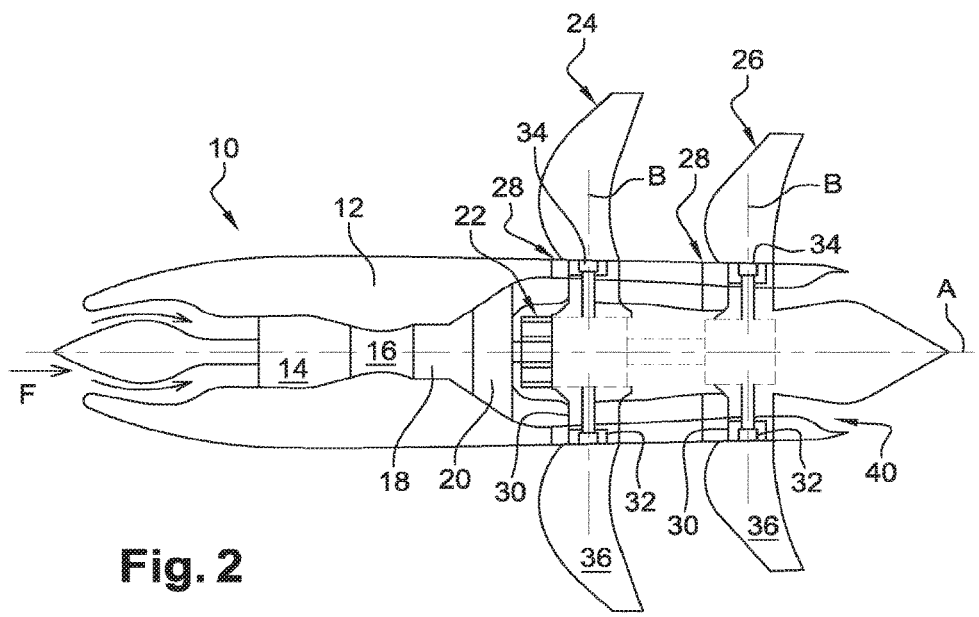
FIG. 2 is a schematic longitudinal sectional view of the turbine engine from FIG. 1.

Reference is made first of all to FIGS. 1 and 2, which schematically depict a turbine engine 10 comprising an unducted fan for an aircraft, which is also known as an "open rotor". Said turbine engine 10 usually comprises, from upstream to downstream in the direction of the gas flow F inside a nacelle 12, a part 14 having compressor(s), an annular combustion chamber 16, a turbine part 18, the downstream turbine 20 of which drives, by means of an epicyclic gear or gearbox 22 and in a contrarotating fashion, two external propellers 24, 26 which are aligned coaxially along the longitudinal axis A of the turbine engine and constitute a fan.

In the present application, the terms upstream and downstream refer to the flow F in the turbine engine 10.

The propellers, namely the upstream propeller 24 and the downstream propeller 26, are arranged in parallel radial planes, which are perpendicular to the axis A, and turn by means of the downstream turbine 20 and the gear 22 in opposite rotation directions.

Figure 3:
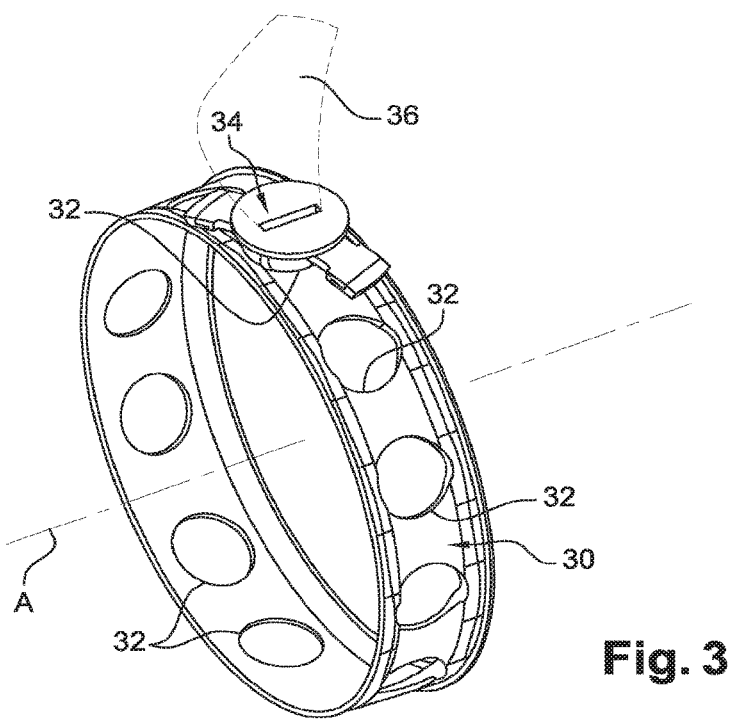
FIG. 3 is a schematic perspective view of a ring of an external propeller hub of the turbine engine from FIG. 1, said ring comprising recesses in one of which a blade-support plate is mounted.

The upstream propeller 24 comprises a rotary hub 28, which is connected to a corresponding portion of the gear 22 in order to rotate together therewith in one direction. Said hub 28 is supported by bearings on a fixed cylindrical casing of the turbine engine, the bearings and fixed casing not being shown. The hub 28 comprises a rotary ring 30 housed in the usual fashion in the nacelle 12 and receiving, in cylindrical housings 32, plates 34 for supporting the blades 36 of the propeller 2 and guiding them in rotation (FIG. 3). The blades 36 project externally with respect to the nacelle 12.

In a similar fashion, the downstream propeller 26 comprises a rotary hub 28, connected on one side to another portion of the gear 22 in order then to rotate together therewith in the opposite direction. Said hub 28, supported by bearings, comprises a rotary ring 30 receiving, in a similar fashion to before, in cylindrical recesses 32, the plates 34 supporting the blades 36 of the propeller 26.

In operation, and briefly, the air flow F entering the turbine engine 10 is compressed and then mixed with fuel and burnt in the combustion chamber 16. The combustion gases generated then pass into the turbine part 18 in order to drive, in opposite rotations, via the epicyclic gear 22, the propellers 24, 26, which provide most of the thrust. The combustion gases are expelled through an exhaust nozzle 40 in order thus to increase the thrust of the turbine engine.

The blades 36 of the propellers 24, 26 are of the variable pitch type, that is to say they can turn in the respective recesses 32 thereof about radial geometric axes B of the plates 34 by means of systems for controlling the pitch of the blades, so that they adopt, as stated previously, an optimum angular position according to the operating conditions of the turbine engine and the flight phases in question.

Each blade 36 may comprise, at the radially inner end thereof, a root, having a dovetail-shaped cross section for example, which is fitted in a groove having a complementary shape in the corresponding plate 34 (FIG. 3).

Reference is now made to FIGS. 4 to 14, which depict a first embodiment of an unducted fan of a turbine engine, according to the invention.

As mentioned above, the propeller essentially comprises two parts, namely a rotary hub 28 and an annular array of blades 36.

The hub 28 has an axis of revolution, which is combined with the axis A, and the blades 36 extend radially outwards with respect to the axis A, the radially inner ends thereof being connected to or fitted in the plates supporting the blades 36.

The hub 28 comprises a ring 30 of the type depicted in FIG. 3, two collars 38, 39 which are mounted respectively upstream and downstream of the ring, and cowling around the hub.

As described above, the ring 30 comprises an annular array of recesses 32 for mounting the plates 34 supporting the blades 36. WO A1 2011/069981 describes this type of ring.

Figure 13:
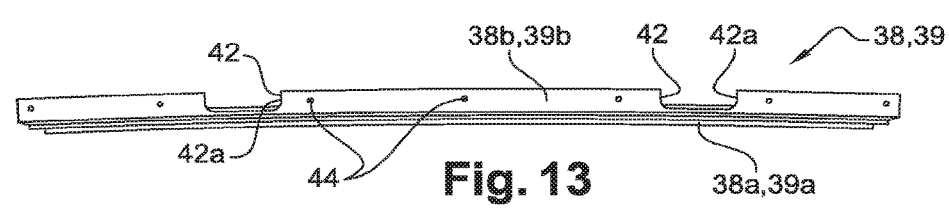
FIGS. 13 and 14 are partial schematic perspective views of a collar of the hub of the propeller from FIGS. 4 and 5.
Figure 14:
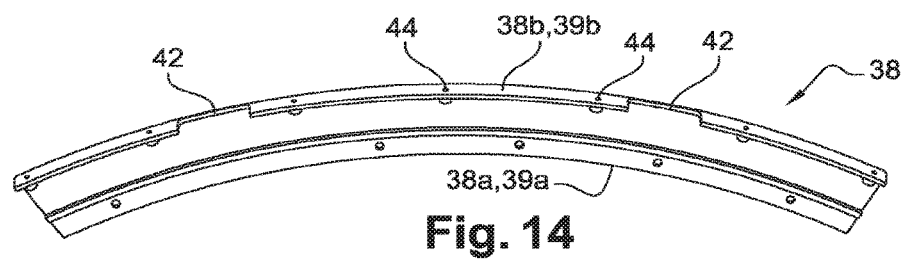

The collars 38, 39, one of which is shown FIGS. 13 and 14, are coaxial with the ring 30. They each comprise a radial annular wall 38a, 39a connected at the outer periphery thereof to a cylindrical rim 38b, 39b. In a variant, they could be formed by simple annular elements that may optionally be formed in a single piece with the ring 30.

The wall 38a, 39a of each collar 38, 39 comprises, at the inner periphery thereof, an annular flange for fixing to the ring 30, by means of the screw-and-nut type.

The upstream collar 38 is fixed to the upstream circumferential edge of the ring so that the rim 38b thereof is oriented downstream, and the downstream collar 39 is fixed to the downstream circumferential edge of the ring so that the rim 39b thereof is oriented upstream.

Figure 9:
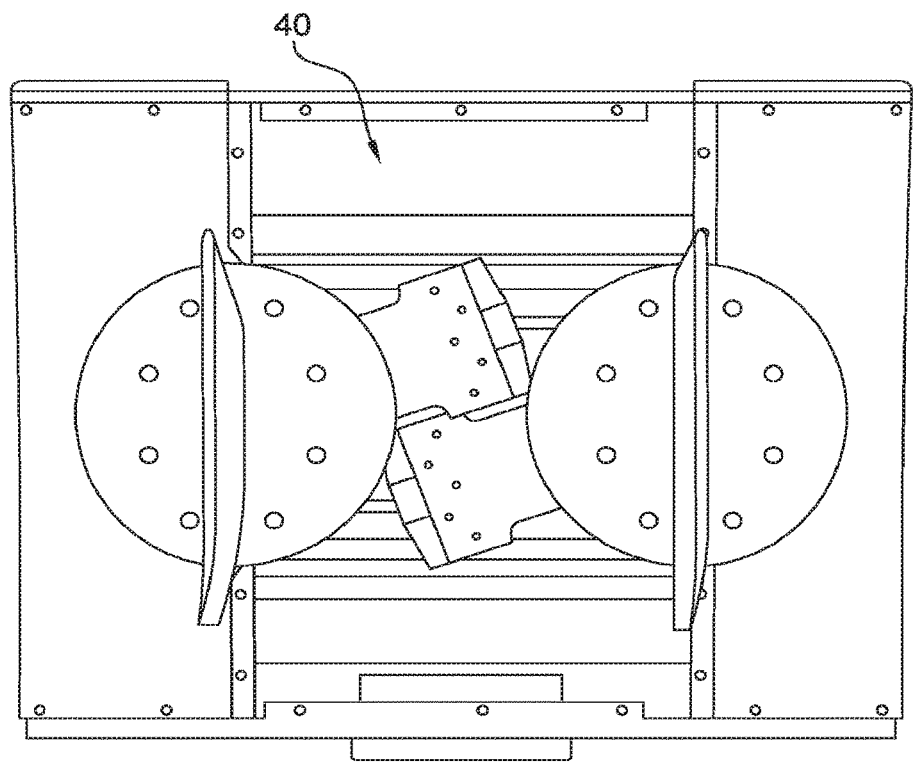
Figure 10:
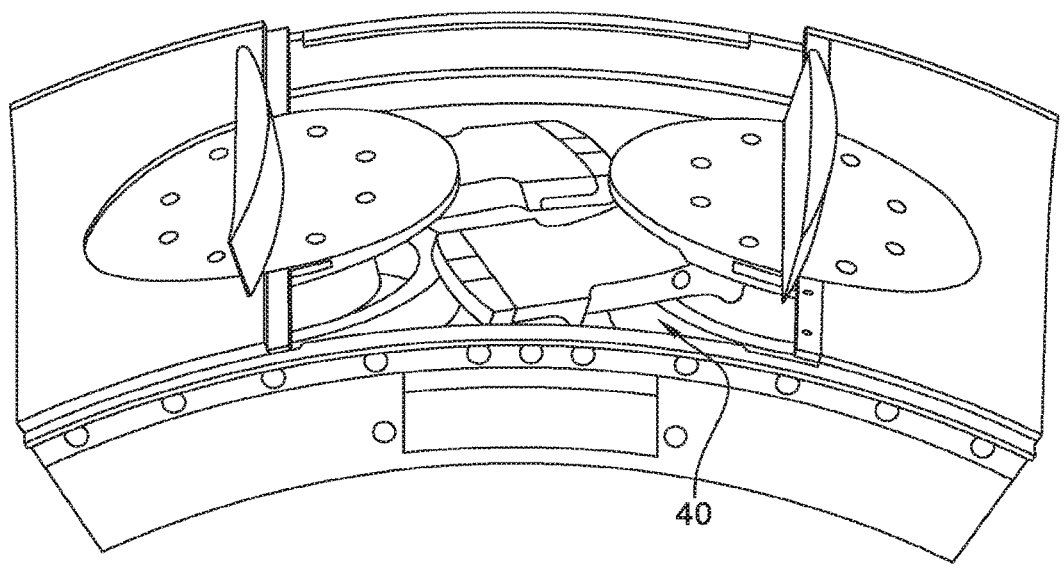

The collars 38, 39 define an annular space 40 therebetween and around the ring 30, which space can be seen in FIGS. 9 and 10. In said space 40, portions of the plates 34 can extend and equipment such as a telemetry box can be mounted.

The rims 38b, 39b further comprise orifices 44 for fixing the cowling by means of the screw-and-nut type. Said rims 38b, 39b each comprise an annular array of radial through notches 42. Each of the rims 38b, 38b is thus of the sectored type and each rim sector comprises, at each of the circumferential ends thereof, an edge 42a extending substantially in parallel with the axis A.

The cowling comprises an annular array of cowls 46 that are each mounted between the radially inner ends and the plates 34 of two adjacent blades 36.

Figure 11:
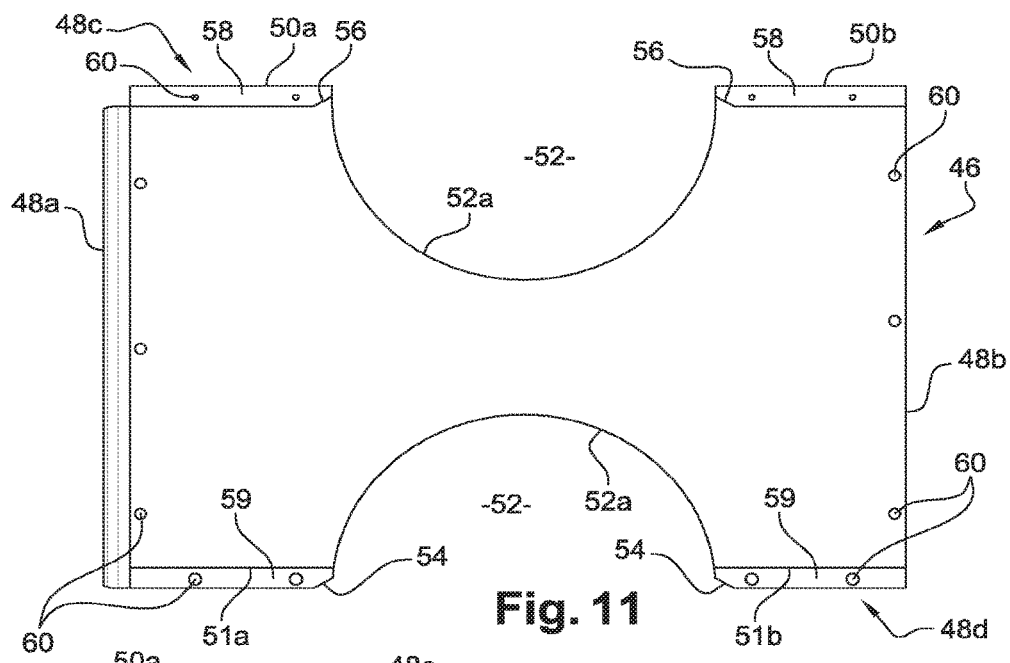
FIGS. 11 and 12 are partial schematic perspective views of the cowl of the propeller from FIGS. 4 and 5.
Figure 12:
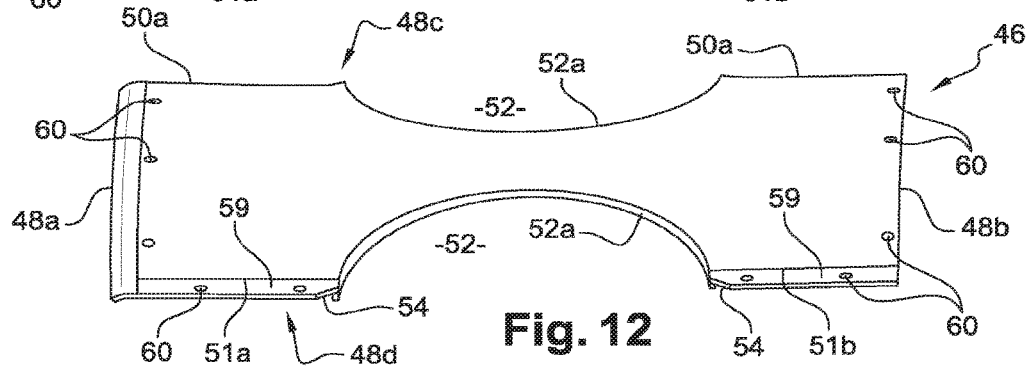

FIGS. 11 and 12 show a cowl 46 according to the invention. Such a cowl is for example manufactured from injection-moulded composite material. In the example shown, the cowl 46 has a rounded shape (around the axis A), although this non-limiting. It comprises an upstream circumferential edge 48a and a downstream circumferential edge 48b, as well as lateral or circumferential ends 48c, 48d of the cowl.

The circumferential end 48c comprises two longitudinal edges 50a, 50b, which are upstream and downstream respectively, which are separated from each other by the peripheral edge 52a of a middle notch 52 of the cowl. The other circumferential end 48d comprises two other longitudinal edges 51a, 51b, which are upstream and downstream respectively, which are separated from each other by the peripheral edge 52a of another middle notch 52 of the cowl. Said other two longitudinal edges 51a, 51b are formed on lugs 59, in this example lugs of a reduced thickness that form shoulders on the inner face of the cowl at the junction thereof with the main portion of the cowl, which has a greater thickness.

Each notch 52 has a concave curved shape that extends over an angle of approximately 180°. It has a shape which is complementary to that of the plate 34 so that, when the cowl 46 is mounted, a minimum spacing can be left between the edge 52 thereof and the plate 34.

The longitudinal edges 50a, 50b, 51a, 51b of each circumferential end of the cowl in this case are substantially rectilinear and parallel to the axis A. They extend substantially in the same radial plane passing through the axis A.

The edges 50a, 50b form joint edges intended to be contiguous with the edges 51a, 51b of the closest cowl. An edge 52a for its part is almost contiguous with the closest plate, a minimum separation being preserved so that the rotation of the plate takes place without rubbing against the edge 52a. In the same way, the edges 51a, 51b form joint edges which are intended to be contiguous with the edges 50a, 50b of the closest cowl. The edges 50a, 50b, 51a, 51b of a cowl thus have a shape which is complementary to that of the corresponding edges 51a, 51b, 50a, 50b of the two adjacent cowls, as can be seen in the drawings.

It will thus be understood that the cowling of the propeller has no inter-cowl packings and that the circumferential extent of each cowl is equal to or greater than 360°/n, n being the number of cowls (which is equal to the number of blades or plates, and is for example equal to twelve). A circumferential extent greater than 360°/n corresponds to the case in which the circumferential ends 48c and 48d of the cowls overlap at the lugs 58 and 59.

The longitudinal edges 51a, 51b of the lateral edge 48d are bevelled at the longitudinal ends thereof which are connected to the edge 52a (bevels 54).

The longitudinal edges 50a, 50b of the lateral edge 48c each comprise, at the longitudinal ends thereof which are connected to the edge 52a, a pointed portion 56 having a shape which is complementary to that of the corresponding bevel 54 of the adjacent cowl.

The cowl 46 comprises, at each of the longitudinal edges 50a, 50b of the lateral edge 48c thereof, a lug 58 which is configured so as to extend circumferentially under a lug 59 of the lateral end of an adjacent cowl and thus be covered by said adjacent cowl lug.

Each lug 58 in this example has a reduced thickness that forms a shoulder on the outer face of the cowl at the junction of the lug with the main portion of the cowl, and extends over substantially the entire longitudinal dimension of the corresponding longitudinal edge 50a, 50b. The radially outer surface thereof is offset radially inwards with respect to that of the rest of the cowl, by a radial distance which is at least equal to the radial thickness of the circumferential end 48d and of the edges 50a, 50b of said end of the cowl, so that, in the mounting position, the outer surfaces of the cowls can be aligned circumferentially with each other, in particular at the circumferential ends 48c, 48d thereof.

The cowl 46 also comprises orifices 60 for the passage of fixing means of the screw-and-nut type. Said orifices are distributed along the circumferential edges 48a and 48b and the longitudinal edges 50a, 50b, 51a, 51b. Orifices are situated on the lugs 58 of each cowl and are intended to have screws pass therethrough, which are mounted in the orifices in the circumferential end 48d of an adjacent cowl. The cowls 46 are in abutment on the rims 38b, 39b of the collars 38, 39, and the screws mounted in the orifices in the edges 48a, 48b of the cowls pass through the orifices 44 in the rims 38b, 39b.

Reference is now made to FIGS. 4 to 10, which show steps of a method according to the invention for mounting or dismounting cowls 46 of the external propeller.

Figure 4:
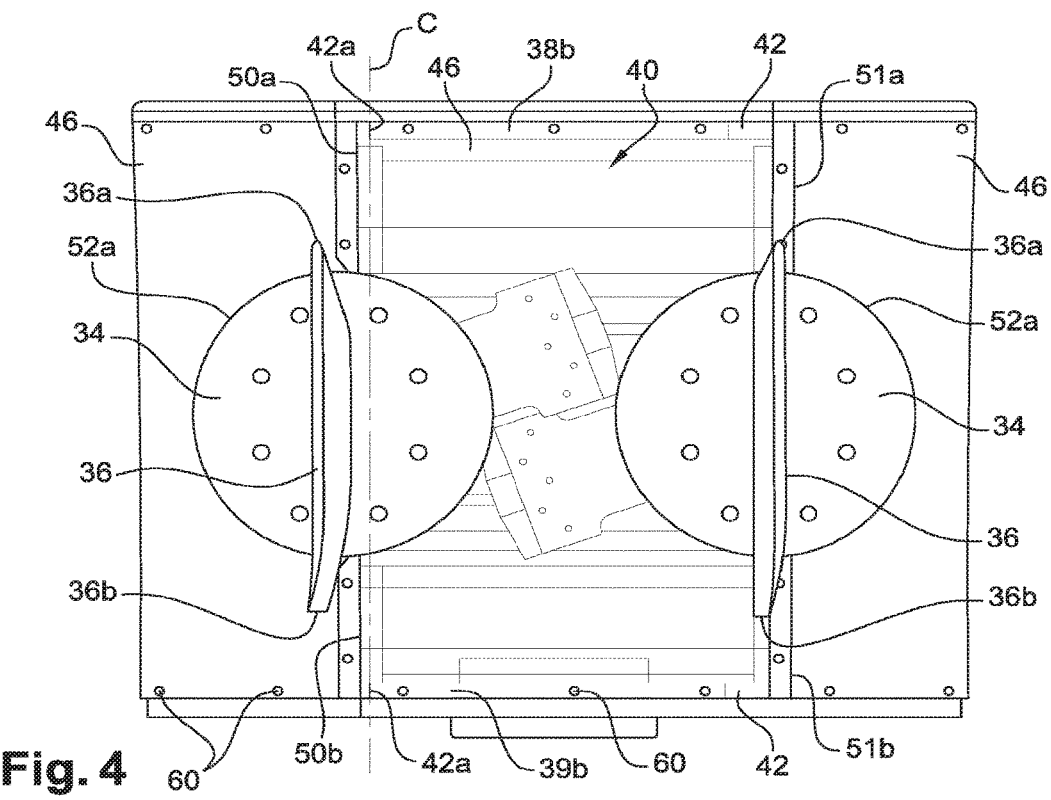
FIGS. 4 and 5 are partial schematic perspective views of an external fan propeller according to the invention.
Figure 5:
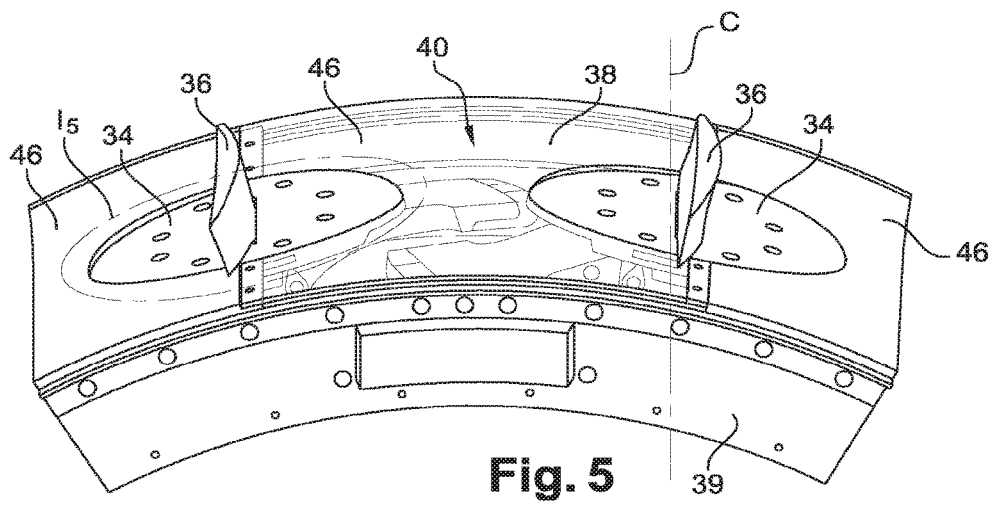

FIGS. 4 and 5 show a propeller portion or sector, one of the cowls 46 of which, the central cowl, is transparent, so as to be able to view the aforementioned space 40.

The blades 36 of the propeller in this case are depicted partially and in the feathered position, in which they are substantially parallel to the axis A.

Each blade 36 comprises a leading edge 36a and a trailing edge 36b for the air flowing around the nacelle of the turbine engine in operation.

Figure 5A:
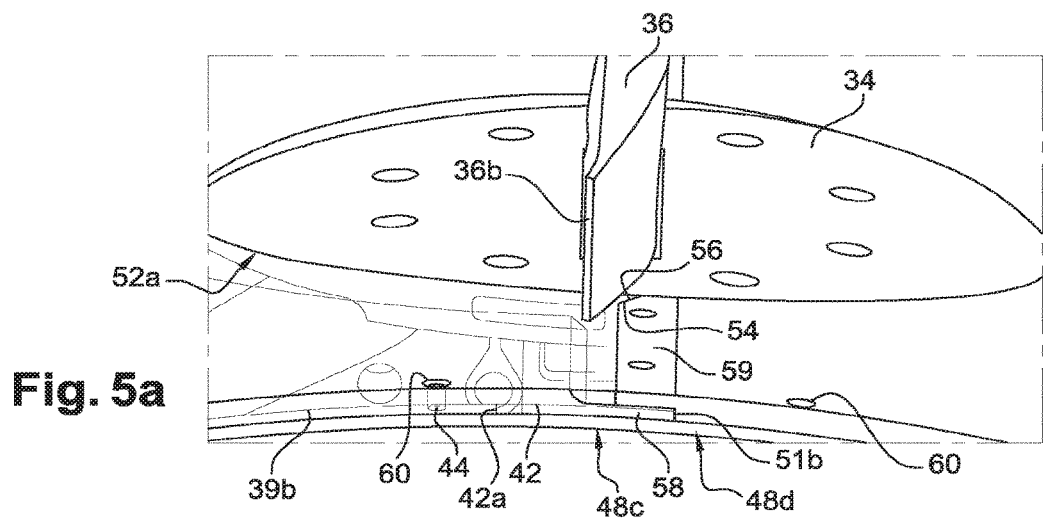
FIG. 5a is a larger-scale view of the detail $I_5$ from FIG. 5.
Figure 6:
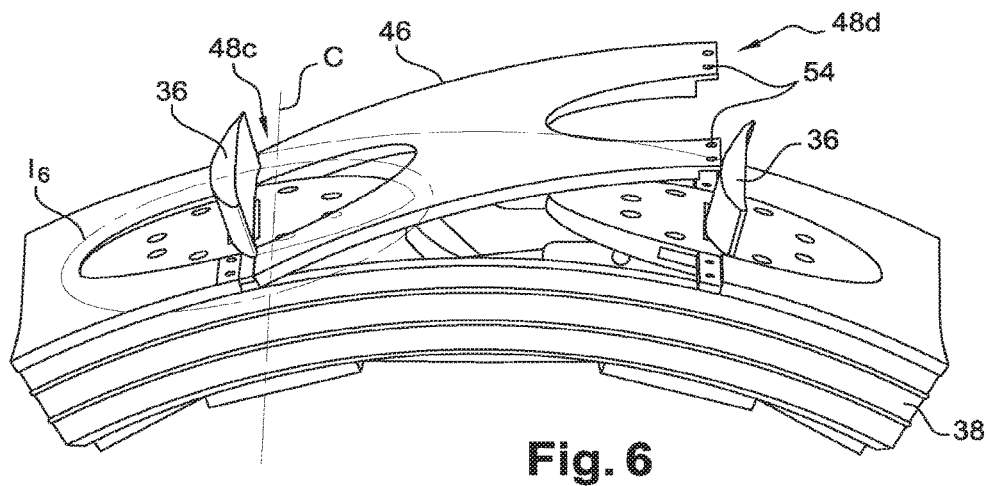
FIG. 6 is a partial schematic perspective view of the propeller from FIGS. 4 and 5, and depicts a step of mounting/dismounting the propeller.

As can be seen in FIGS. 4, 5a and 6, the blades 36 have a longitudinal dimension or chord which is greater than the longitudinal dimension or the diameter of the plate 34, and the downstream ends of the blades comprising the trailing edges 36b therefore extend towards the downstream end, beyond the plate 34.

The cowls 46 are configured so as to extend under the downstream ends of the blades 36 (FIG. 5a) and at a small distance therefrom. It is also noted that the edges 52a, 50a, 50b, 51a, 51b of the cowls follow, with small clearances, the shapes of the plate 34 and the edges 51a, 51b, 50a, 50b of the adjacent cowls. The lug 58 of a cowl can also be seen, which is covered by the lug 59 of the adjacent cowl (FIG. 5a).

It can be seen that the orifices 60 of the cowls 46 are aligned with orifices in the adjacent cowls and orifices 44 in the rims 38b, 39b of the collars 38, 39. It can further be seen, in particular in FIG. 4, that the notches 42 in the rims 38b, 39b are situated at the corners of the cowls, in the regions where the circumferential edges 48a, 48 are connected to the longitudinal edges 50a, 50b, 51a, 51b. In other words, the cowls do not rest on the rims 38b, 39b of the collars 38, 39 at the corners of said cowls.

After the unscrewing and removal of the screws fixing the cowls 46 (FIGS. 4, 5 and 5a), a step of the dismantling method consists in pivoting a cowl 46 (in this case the transparent central cowl) about an initial pivot axis C.

The initial pivot axis C preferably passes substantially through the edge 42a of at least one of the collars 38, 39 (which is a contact edge between the cowl and the collar or collars) and is circumferentially at a distance from the joint edges 50a, 50b, 51a, 51b of the circumferential ends 48c, 48d of the cowl.

In the example shown, the initial pivot axis C of each cowl 46 is situated in the vicinity of the lateral end 48c (comprising the lugs 58) and is at a circumferential distance from the edges 50a, 50b of said end. It passes through the edges 42 of two notches 42 opposite the rims 38b, 39b.

Figure 6A:
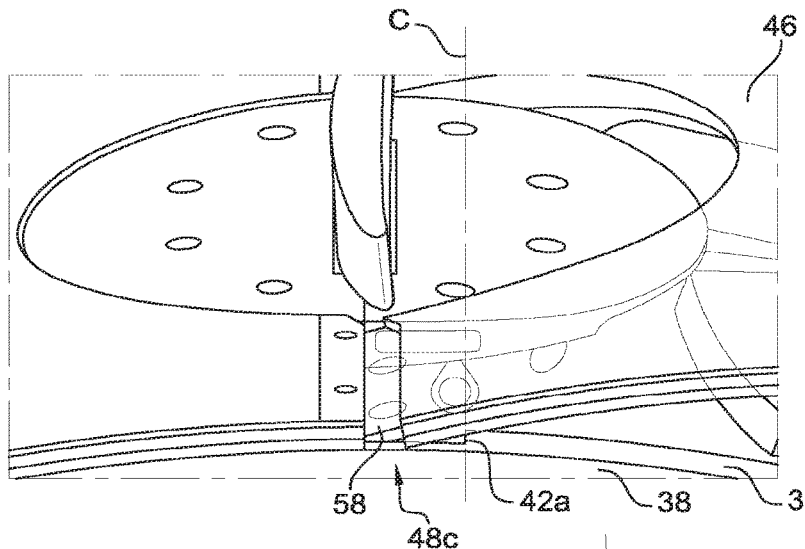
FIG. 6a is a larger-scale view of the detail $I_6$ from FIG. 6.
Figure 7:
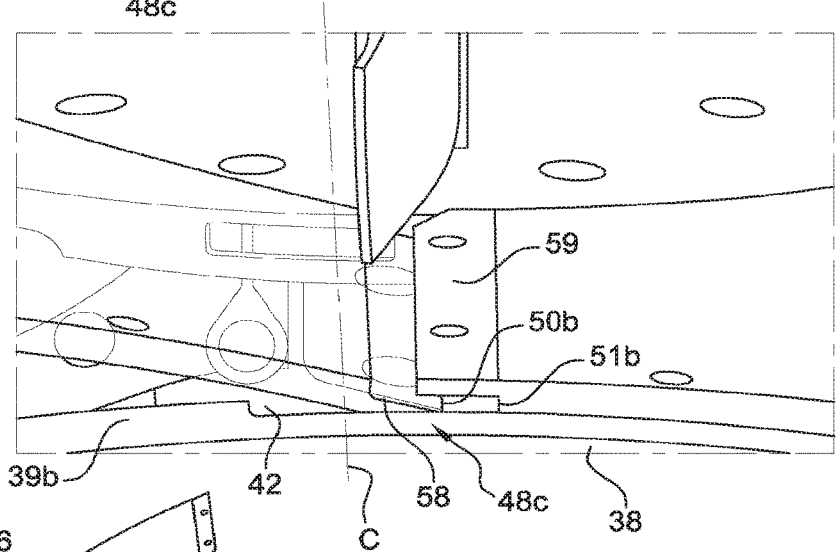
FIG. 7 is a larger-scale view of another detail of the propeller from FIG. 6.
Figure 8:
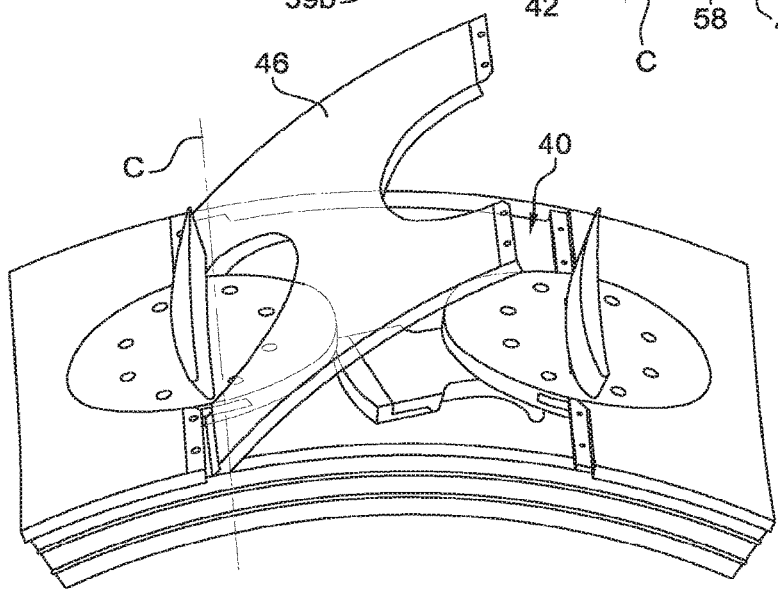
FIGS. 8 to 10 are partial schematic perspective views of the propeller from FIGS. 4 and 5, and depict other steps of mounting/dismounting the propeller.

When the cowl 46 pivots, the circumferential end 48c comprising the lugs 58 pivots about the axis C, radially inwards, until it enters the aforementioned space 40, passing through the corresponding notches 42 in the rims 38b, 39b of the collars 38, 39 (FIGS. 6a and 7). The opposite circumferential end 48d of the cowl pivots about the axis C, radially outwards, and lifts while moving away from the rims 38b, 39b of the collars 38, 39. This in particular allows the cowl to be extracted from the plate 34 situated on the same side as the circumferential end 48d of the cowl. The pivoting of the cowl may take place initially over a relatively small angle, for example of approximately 10°-20° (FIG. 6). This angle may vary from one operator to another. This movement is performed over a relatively small angle for several reasons. First of all, the blades 36 adjacent to the cowl may comprise portions covering the cowl. This is particularly the case with the blade situated on the same side as the circumferential end 48c of the cowl, where the radially inner end of the trailing edge and/or of the leading edge covers said circumferential end in part. An initial pivoting of the cowl 46 over an excessively great angle would risk causing contact between the cowl and said radially inner end of the trailing edge of the blade. Moreover, the upstream circumferential edge 48a of the pivot may have a particular shape which can be seen in FIG. 12. When the cowl pivots, said edge 48a, which covers the outer periphery of the upstream collar 38a, could come into contact with said periphery and prevent additional pivoting of the cowl about the initial pivot axis C.

The cowl 46 must next be moved laterally as well as radially outwards in order to partly extract the circumferential end 48c thereof from the space 40 (FIGS. 6a and 7), by pulling it in a direction which is substantially parallel to the cowl and oriented towards the blade situated on the same side as the end 48d of the cowl. This translation makes it possible to move the centre of the cowl away with respect to the radially inner ends of the trailing edge and of the leading edge of the aforementioned blade, while increasing the separation between the outer surface of the cowl and said radially inner ends of the blade.

As a result of the aforementioned increase in the separation, a second pivoting of the cowl can then take place over a larger angle, for example of approximately 30°-50° (FIG.

8), without the outer surface of the cowl coming into abutment against the radially inner end of the trailing edge or of the leading edge of the aforementioned blade. The pivoting takes place about a final pivot axis C, which corresponds to a movement of the initial pivot axis C. In the example depicted, the final pivot axis C is parallel to the initial axis C and extends perpendicularly to the upstream circumferential edge 48a of the cowl. The pivot axis C can move over the collars as the cowl is removed. At the circumferential end 48d of the cowl, bevels 54 on the cowl may be required and sized so as to allow this further pivoting by allowing the cowl to pass as close as possible to the blade situated on the same side as said end 48d of the cowl without abutting against said blade. The invention is however not limited to the case in which such bevels are present. The blade on the same side as the circumferential end 48d of the cowl may be sized so as to allow the passage of the cowl even when there are no bevels.

The cowl 16 can next be removed in order to inspect the space 40 and to proceed with a maintenance operation for example (FIGS. 9 and 10). If necessary, other cowls 46 on the propeller are removed, by proceeding in the same way. In order to reassemble one or more cowls, the aforementioned steps can be repeated in the reverse order.

Figure 15:
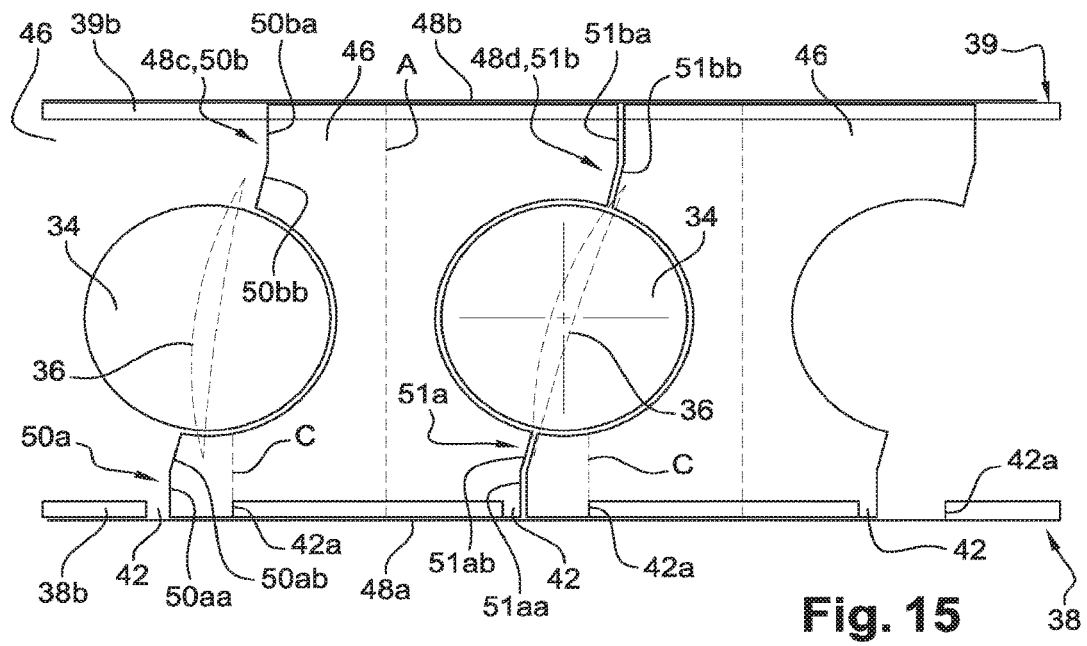
FIGS. 15 and 16 are partial highly schematic views of variant embodiments of an external fan propeller according to the invention.
Figure 16:
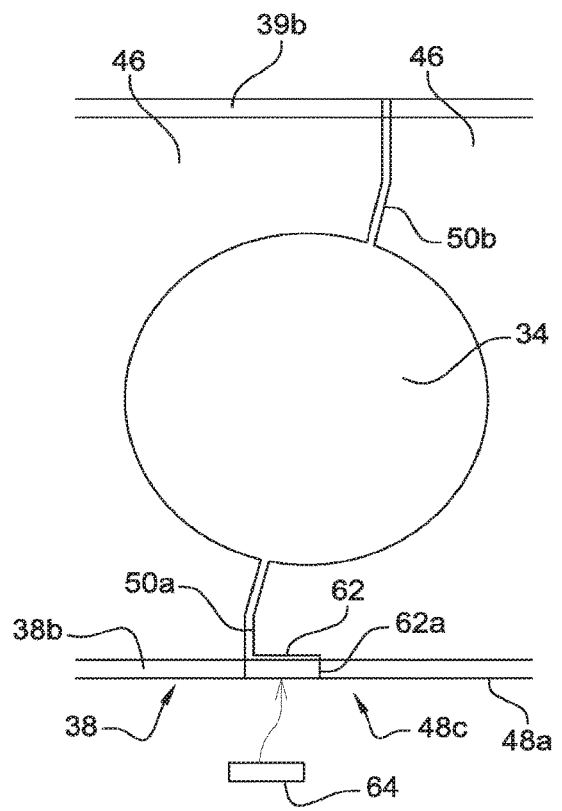

FIGS. 15 and 16 depict more schematically variant embodiments of the invention. In these drawings, the elements already described above are denoted by the same reference numerals.

In FIG. 15, the ring of the hub is similar to the one described above. The upstream collar 38 of the hub is also similar to the one described above. By contrast, the downstream collar 39 is different, since the rim 39b thereof has no notches 42 in this case.

The plates 34 and the blades 36 are similar to those described above. The two visible blades are not set in the same position. The left-hand blade in the drawing is in the feathered position, whereas the right-hand one is inclined with respect to the axis A, so as to be able to remove the cowl 46 which is mounted between said blades 36.

In this case, the cowls 46 have a peripheral contour having a shape which is different from the one in the previous embodiment.

Each cowl 46 has a rounded shape about the axis A and comprises an upstream circumferential edge 48a and a downstream circumferential edge 48b, which are interconnected at the lateral or circumferential ends 48c, 48d of the cowl.

Each circumferential end 48a, 48d comprises two edges 50a, 50b, 51a, 51b, which are upstream and downstream respectively, which are interconnected by the peripheral edge 52a of a middle notch 52 in the cowl.

Each notch 52 has a concave curved shape that extends over an angle of approximately 180°. It has a shape which is complementary to that of the plate 34 so that the cowl 46 can be mounted so as to fit, via the edge 52a thereof, on the plate 34.

The edges 50a, 50b, 51a, 51b of each circumferential end of the cowl form joint edges as described in the above, and in this case have a substantially V-shaped form and comprise a first edge portion 50aa, 50ba, 51aa, 51ba that is rectilinear and substantially parallel to the axis A, and a second edge portion 50ab, 50bb, 51ab, 51bb that is rectilinear and inclined with respect to the axis A. The edges 50aa, 50ba of each circumferential end of the cowl are offset circumferentially from each other. Moreover, the edge 50ba of the end 48c of each cowl is either aligned on the pivot axis C of the cowl or offset circumferentially from the axis C towards the end 48d of the cowl. It will thus be understood that, when the cowl pivots about this axis C, the entire downstream circumferential edge 48b of the cowl will lift and move away from the rim 39b, and that it is therefore not necessary to provide notches 42 on said rim to allow pivoting of the cowl. During this pivoting, it is the portion of the end 48c of the cowl comprising the edge 50a, and which is situated in line with the leading edge of the left-hand blade 36, that will enter the space 40. The opposite end 48d of the cowl is not interfered with by the right-hand blade because of the inclination thereof, and therefore does not risk coming into contact with the blade during pivoting.

The cowl can be removed in the following manner. From the two blades which are adjacent to the cowl, the blade which is furthest away from the initial pivot axis C of the cowl is put in a position in which the radially inner end of the blade does not comprise any region covering the circumferential end 48e of the cowl, while the blade which is closest to the pivot axis C has a leading edge having a radially inner end covering another circumferential end 48c of the cowl, and then the cowl 46 is pivoted about the initial pivot axis C, so that the circumferential end 48d of the cowl which is furthest away from said axis C moves radially away from the hub 28. Finally, the cowl is removed, this step being able to comprise a substep consisting in moving the cowl so that the centre thereof circumferentially approaches the blade which is furthest away from the initial pivot axis C, while causing the cowl to pivot about a pivot axis which is combined with or separate from the initial pivot axis C.

In FIG. 16, the ring of the hub is similar to the one described in the above. By contrast, the two collars 38, 39 are different since the rims 38b, 39b thereof are both devoid of notches 42.

The cowls 46 are similar to those in FIG. 15 with the exception of the fact that in this case, they each additionally comprise a notch 62 at the upstream end of the circumferential end 48c thereof. Said notch 62 has a function similar to that of the aforementioned notches 42, since it is intended to allow pivoting of the cowl 46 about the pivot axis C. In other words, instead of providing a notch for pivoting each cowl on at least one of the rims 38b, 39b of the collars 38, 39, said notch is provided on each cowl. The recess 62 of each cowl 46 defines an edge 62a that extends substantially in parallel with the axis A, and through which the pivot axis C of the cowl is intended to pass.

It will be understood that the notch 62 must extend over a circumferential distance, along the edge 48a, that is sufficient for pivoting. It may for example extend from the end 48c substantially as far as the axis C. The notch 62 must additionally have a longitudinal dimension, along the axis A, which is at least equal to that of the corresponding rim 38b so that the portion of the end 48c of the of the cowl comprising the edge 50a can enter the aforementioned space 50 when the cowl pivots.

In order to improve the aesthetic appearance of the assembly and in particular to optimise the aerodynamics of the cowling by preventing turbulence in the air flow around the cowling, a plug 64 is attached and fixed to the rim 38b of the collar in order to fill in the void space caused by each notch 62. The radially outer surface of the plug 64 of each cowl is aligned with that of the adjacent cowls in order not to give rise to any pressure drop in operation. In a variant, the plugs 64 for all the cowls 46 of the propeller could be formed in a single piece with the rim 38b, which could for example comprise an annular array of projecting outer radial protrusions that would form said plugs 64.

The invention claimed is:

1. An unducted fan for an aircraft turbine engine, comprising:

a propeller comprising a hub and an annular array of blades extending substantially radially outwards from said hub, the hub comprising an annular array of cowls, each of the cowls being mounted between radially inner ends of adjacent blades and suitable for being fixed to an upstream collar and to a downstream collar of the hub, wherein at least one cowl comprises, at a circumferential end, at least one joint edge which is contiguous with a complementary joint edge of an adjacent cowl, wherein said at least one cowl and at least one of said upstream and downstream collars are configured so that the at least one cowl can be mounted and dismounted by a movement including pivoting about an initial pivot axis which is circumferentially offset from said at least one joint edge towards a center of the at least one cowl, and so that, during said pivoting, said at least one joint edge moves radially inward from said complementary joint edge, and wherein said initial pivot axis passes substantially through at least one pivot region of contact between the at least one cowl and at least one of the upstream collar and the downstream collar of the hub.

2. The unducted fan according to claim 1, wherein each cowl comprises, at each of the circumferential ends thereof, a first joint edge on the upstream side and a second joint edge on the downstream side, said first and second joint edges being connected by a complementary concave curved edge of a plate supporting a blade.

3. The unducted fan according to claim 2, wherein:

the first and second joint edges of each circumferential end of each cowl are aligned at least in part, or the first and second joint edges of each circumferential end of each cowl extend at least in part in respectively two straight lines which are substantially parallel to each other and are separated circumferentially from each other.

4. The unducted fan according to claim 1, wherein each joint edge has a straight shape which is substantially parallel to an axis of revolution of the propeller or has a shape having two contiguous straight-line segments, one of which is substantially parallel to said axis of revolution.

5. The unducted fan according to claim 2, wherein the joint edges of one of the circumferential ends of each cowl each comprises a beveled end portion that joins said concave curved edge.

6. The unducted fan according to claim 1, wherein each cowl comprises, at one of the circumferential ends thereof, a lug of reduced thickness terminating in said at least one joint edge and configured so as to be covered by a complementary lug of reduced thickness of the adjacent cowl, said lug comprising said complementary joint edge.

7. The unducted fan according to claim 6, wherein the lug comprises screw mounting orifices for fixing the cowl to the adjacent cowl.

8. The unducted fan according to claim 1, wherein each collar comprises a cylindrical rim for supporting and fixing a circumferential edge of each cowl, a pivot region for contact between the at least one cowl and at least one of said collars being formed on at least one of said cylindrical rims.

9. The unducted fan according to claim 8, wherein:

the cylindrical rim of at least one of the collars comprises radial through notches which are configured so as to allow the pivoting of the cowls, or at least one of the circumferential edges of each cowl comprises at least one radial through notch which is configured so as to allow pivoting of the cowl.

10. The unducted fan according to claim 9, wherein at least one of said radial through notches creates an edge forming said pivot region for contact.

11. The unducted fan according to claim 1, wherein the cowls are covered by radially inner ends of at least one of leading edges and trailing edges of at least one of the blades.

12. A method for removing a cowl of an unducted fan according to claim 1, the method comprising:

a) from the two blades which are adjacent to the cowl, putting the blade which is furthest away from the initial pivot axis of the cowl in a position in which the radially inner end of the blade does not comprise any region covering a circumferential end of the cowl, while the blade which is closest to said pivot axis has at least one of a leading edge and a trailing edge having a radially inner end covering another circumferential end of the cowl, b) pivoting the cowl about said initial pivot axis, so that the circumferential end of the cowl which is furthest away from said axis moves radially away from the hub, and c) removing the cowl.

13. The method according to claim 12, wherein step c) includes moving the cowl so that the center thereof circumferentially approaches the blade which is furthest away from the initial pivot axis, while pivoting the cowl about a pivot axis which is combined with or separate from the initial pivot axis.

* * * * *

UNITED STATES PATENT AND TRADEMARK OFFICE
CERTIFICATE OF CORRECTION

PATENT NO. : 10,118,710 B2
APPLICATION NO. : 15/050637
DATED : November 6, 2018
INVENTOR(S) : Charles-Henri Michel Marie Derrez et al.

It is certified that error appears in the above-identified patent and that said Letters Patent is hereby corrected as shown below:

On the Title Page

Item (71) the Applicants' information is incorrect. Item (71) should read:
--(71) Applicants: SAFRAN AIRCRAFT ENGINES, Paris (FR);
            AIRCELLE, Gonfreville l'Orcher (FR)--

Signed and Sealed this
First Day of October, 2019

Andrei Iancu
*Director of the United States Patent and Trademark Office*